United States Patent [19]

Lembke

[11] Patent Number: 4,624,284

[45] Date of Patent: Nov. 25, 1986

[54] SERVOVALVE

[75] Inventor: Herbert Lembke, Lohr, Fed. Rep. of Germany

[73] Assignee: Mannesmann Rexroth GmbH, Lohr, Fed. Rep. of Germany

[21] Appl. No.: 693,756

[22] Filed: Jan. 24, 1985

[30] Foreign Application Priority Data

Jan. 28, 1984 [DE] Fed. Rep. of Germany ....... 3403015

[51] Int. Cl.[4] .............................................. F16K 11/07

[52] U.S. Cl. .......................... 137/625.62; 137/625.64; 91/365; 91/387; 403/122

[58] Field of Search ................ 137/85, 625.64–625.66, 137/625.62; 91/365, 387; 403/115, 121, 122

[56] References Cited

U.S. PATENT DOCUMENTS

| | | | |
|---|---|---|---|
| 634,204 | 10/1899 | Diehl | 403/122 X |
| 3,391,901 | 7/1968 | Wheeler et al. | 251/246 |
| 3,814,131 | 6/1974 | Takahashi et al. | 137/625.62 |
| 3,972,233 | 8/1976 | Pelt et al. | 73/231 R |
| 4,285,358 | 8/1981 | Haydt | 137/85 |

FOREIGN PATENT DOCUMENTS

| | | | |
|---|---|---|---|
| 2911407 | 9/1980 | Fed. Rep. of Germany . | |
| 556554 | 10/1943 | United Kingdom | 403/122 |
| 923839 | 4/1963 | United Kingdom | 137/625.62 |
| 2117931A | 10/1983 | United Kingdom . | |

OTHER PUBLICATIONS

Rexroth literature, RD 29 633, 8/81.

Rexroth literature, RD 29 584, 4/79.

*Primary Examiner*—Carroll B. Dority, Jr.
*Assistant Examiner*—Allen J. Flanigan
*Attorney, Agent, or Firm*—Andrew Wilford

[57] ABSTRACT

A servovalve includes a flow-control valve connectable between a source of fluid pressure and a load and having a spool displaceable between an open position permitting fluid flow between the load and the source and a closed position axially offset therefrom and blocking such flow. A pilot valve has an impact plate and a pair of nozzles operatively axially oppositely effective on the spool and oppositely flanking the plate. Thus when the plate is closer to one of the nozzles than to the other the spool is axially displaced into one of its positions and when the plate is closer to the other nozzle the spool is urged axially oppositely. A solenoid-type servomotor is connected to the impact plate to move same between the nozzles so that when it is close to one nozzle it blocks flow therefrom and allows pressure to build up on the corresponding end of the spool, while the other nozzle is opened to reduce pressure at the corresponding spool end. A feedback spring is attached to the impact plate, extends generally radially of the spool, and has a free end projecting into a recess formed in the spool. A force-transmitting ball is fixed to the free end of the spring and fitted in the recess and has an outer surface engageable with the inner surface of the recess. The outer surface of the ball is of corundum and the inner surface of the bore is of steel or vice versa.

3 Claims, 3 Drawing Figures

SERVOVALVE

FIELD OF THE INVENTION

The present invention relates to a servovalve. More particularly this invention concerns an electrically operated feedback-type servovalve.

BACKGROUND OF THE INVENTION

A servovalve of the type described in German patent document No. 2,911,407 filed Mar. 23, 1979 by E. Brokoff and in descriptive literature RD 29,633/8.81 and RD 29,584 of the assignee of the instant application has a flow-control valve connectable between a source of fluid pressure and a load and having a spool displaceable between an open position permitting fluid flow between the load and the source and a closed position axially offset therefrom and blocking such flow. In a standard system the flow-control valve is a four-port three-position reversing valve. A pilot valve forming part of the servovalve has an impact plate and a pair of nozzles operatively axially oppositely effective on the spool and oppositely flanking the plate. Thus when the plate is closer to one of the nozzles than to the other the spool is axially displaced into one of its positions and when the plate is closer to the other nozzle the spool is urged axially oppositely. A solenoid-type servomotor is connected to the impact plate to move same between the nozzles so that when it is close to one nozzle it blocks flow therefrom and allows pressure to build up on the corresponding end of the spool, while the other nozzle is opened to reduce pressure at the corresponding spool end. A feedback spring is attached to the impact plate, extends generally radially of the spool, and has a free end projecting into a recess formed in the spool. A force-transmitting ball is fixed to the free end of the spring and fitted in the recess and has an outer surface engageable with the inner surface of the recess.

The feedback spring serves to urge the impact plate in a direction opposite to that the solenoid servomotor moves it. This feedback prevents the system from locking up and naturally returns it to a stable center position when the servomotor stops acting on the impact plate. In this center position all flow between the load and source is blocked.

Normally both the ball and spool are made of steel. It is therefore possible for them to corrode and stick together. In addition the sliding friction of steel on steel is considerable, so that this delicate force-transmitting coupling can freeze or fail to work accurately after a relatively short service life.

OBJECTS OF THE INVENTION

It is therefore an object of the present invention to provide an improved feedback-type servovalve.

Another object is the provision of such a feedback-type servovalve which overcomes the above-given disadvantages, that is which has a ball-type feedback coupling that operates with minimal friction and that cannot normally freeze up.

SUMMARY OF THE INVENTION

These objects are attained according to the instant invention in an arrangement wherein the inner surface of the spool recess or at least the outer surface of the ball is formed of a monocrystal. Normally the monocrystal is corundum. The other surface is normally steel, so that there is no possibility of the two materials corroding together. In addition the coefficient of friction between them will be very low.

According to this invention the ball is received with a radial play between 0.1 micron and 4 micron in the recess. This amount of play prevents foreign matter from getting wedged between the ball and the normally cylindrical recess, yet is not so great as to eliminate the feedback effect or aggravate wear.

In accordance with another feature of this invention the spool defines and is displaceable along an axis from which the spring extends radially so that the spring and axis define a plane. The recess is a cylindrical bore and the ball is spherical with two opposite flats lying in planes parallel to the plane of the spring and axis. Since there need be no force transmission in the direction transverse to this plane, such flattening of the ball allows foreign matter to drop down in the bore past the ball while reducing friction between the ball and the bore.

The ball of this invention can be of corundum and the spool and the inner surface are of steel. It is also possible for the ball to be of steel and for the spool to have an insert formed of corundum and forming the recess and inner surface.

Corundum is aluminum oxide ($Al_2O_3$) in crystal form and its use in valves is known for a sealing surface (see U.S. Pat. No. 3,391,901). When reddened by chromic oxide it is called ruby and when clear sapphire. It is artificially produced by the single crystal-growing technique and is extensively used for bearings in watches. The monocrystalline type is particularly hard and has a very low coefficient of friction.

DESCRIPTION OF THE DRAWING

The above and other features and advantages will become more readily apparent from the following, it being understood that any feature described with reference to one embodiment of the invention can be used where possible with the other embodiment. In the accompanying drawing.

SPECIFIC DESCRIPTION

Figure 1:
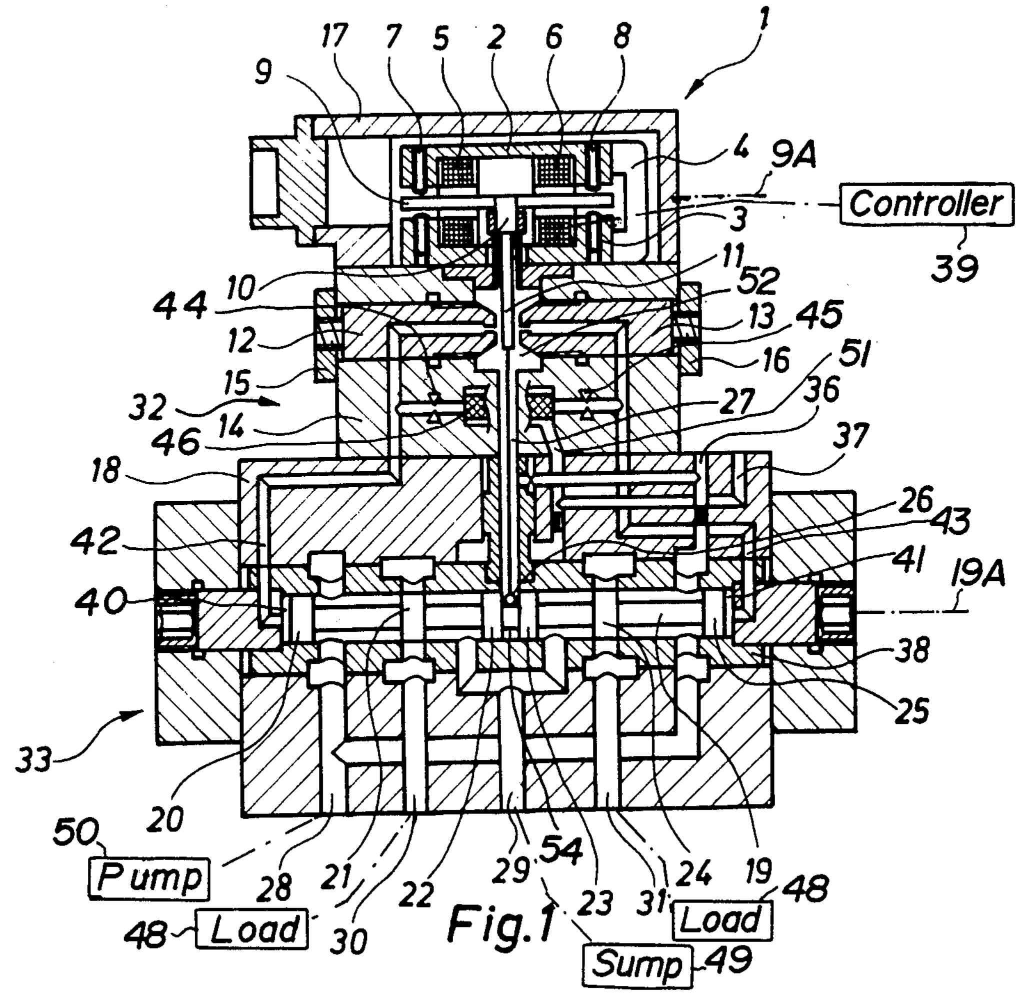
FIG. 1 is an axial section through a servovalve according to the invention.

As seen in FIG. 1 the valve according to this invention basically is formed of a servomotor 1, an impact type pilot valve 32, and a spool-type flow-control valve 33.

The servomotor 1 has a housing 17 containing upper and lower pole pieces 2 and 3 which are bridged by a horizontally extending U-shaped permanent magnet 4. Between and engaging the pole pieces 2 and 3 are two coaxial coils 5 and 6 energized from a remote controller 39 to displace a core rod 9 traversing the coils 5 and 6. Centering screws 7 and 8 allow the position of the axis 9A of this rod 9 to be set accurately. The rod 9 carries a sheet-metal tube 10 to which is secured an impact plate 11 that extends in a plane perpendicular to the axis 9A.

The main flow-control valve 33 is a four-port three-position reversing valve having a housing 18 having a central chamber-defining sleeve 38 in which a spool 19 can move along an axis 19A normally parallel to the axis 9A. The spool 20 has six large-diameter regions 20, 21, 22, 23, 24, and 25. Passages 28 connected to a pump 50 open between the regions 20 and 21 near one end of the spool 19 and between the regions 24 and 25 near the opposite spool end, and a passage 29 connected to a sump 49 opens between the regions 22 and 23 and the respective regions 21 and 24. Further passages 30 and 31 connected to a load 48 open between the passages 28 and 29 and in line with the regions 21 and 24 in the illustrated closed position of the valve 33.

In this center position all flow between the load 48 and the source 50 or sump 49 is blocked and all forces are balanced in the valve 33. If the spool 10 is moved, for example, to the right as seen in FIG. 1 the low-pressure passage 29 will be connected to the load line 30 and the high-pressure passage 28 to the other load line 31. Opposite displacement of the spool 19 from the center position will oppositely pressurize the load.

The pilot valve or pressure amplifier 32 of this invention has a housing 14 carrying nozzles 12 and 13 directed oppositely but parallel to the axis 19A at the opposite faces of the plate 11. The nozzle 12 is pressurized from the pump 49 or another such pressure source via passages 37 and 51, a filter 46, a restriction 46, and a passage 42 at a relatively low control pressure. Similarly, the nozzle 13 is pressurized from the pump 49 via the passages 37 and 51, the filter 46, a restriction 45, and a passage 43 at the same relatively low control pressure. The passages 42 and 43 open into respective compartments 40 and 41 at the left- and right-hand ends of the valve body 19. The chamber 52 containing the plate 11 and into which the nozzles 12 and 13 open is connected via a passage 36 to the sump 49 or the low-pressure side of the control-pressure source.

Thus both of the nozzles 12 and 13 are at substantially the same pressure and the plate 11 is equispaced between them so that the pressures in the chambers 40 and 41 are the same and the spool 19 holds in the central position blocking flow between the pump and sump 49 and 50 on one side and the load 48 on the other. If, for example, the coils 5 and 6 are energized to move the plate 11 to the left as seen in FIG. 1 the resistance to flow out the nozzle 12 will be increased while that in the nozzle 13 will decrease. The pressure will correspondingly build up in the chamber 40 and drop in the chamber 41 to shift the spool 19 to the right, connecting the pump 49 to the load line 31. Opposite shifting of the plate 11 will oppositely shift the spool 19 and pressurize the load line 30.

The plate 11 is provided according to this invention with a feedback arrangement constituted as a spring 27 provided at its lower end with a corundum ball 26 that engages in a groove 54 formed between the ridges or large-diameter portions 22 and 23 of the spool 19. Thus when as mentioned above the plate 11 is shifted to the left to shift the spool 19 to the right, the ball 26 will also be shifted to the right to tension the spring 27 and thereby urge the plate 11 to the left. The effect is therefore to reset the valve 33 in the closed center position so that as soon as the external force acting on the plate 11 from the servomotor 11 is lifted, the valve will automatically self center.

The spool 19 is of steel and the ball 26 is of monocrystalline corundum. There is between 0.1 micron and 4 micron of play between the flanks of the groove 54 and the ball 26.

Figure 2:
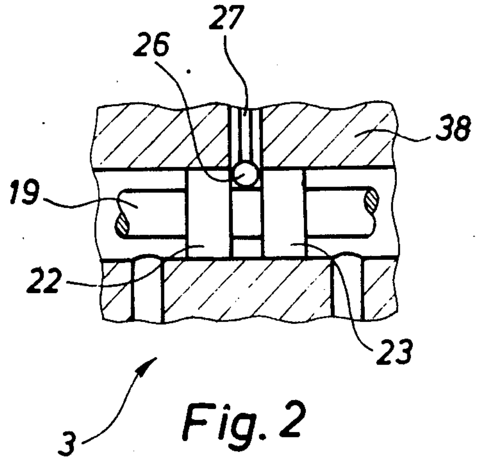
FIG. 2 is a large-scale view of a detail of FIG. 1.
Figure 3:
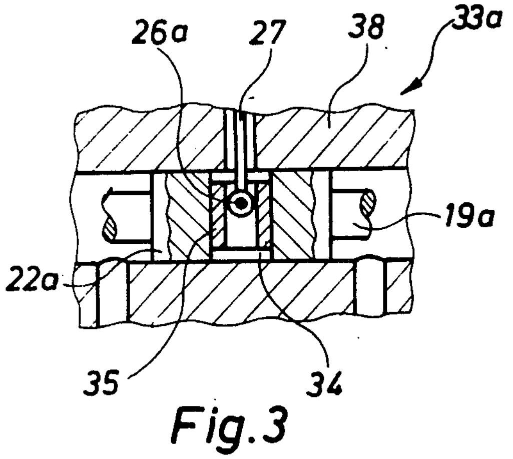
FIG. 3 is a view like FIG. 2 but of a variant on the system of this invention.

In the arrangement of FIG. 3 a valve 33*a* has a spool 19*a* formed with a single central widened region 22*a* replacing the regions 22 and 23. This region 22*a* is diametrally traversed by a cylindrical bore 34 provided with a corundum liner sleeve 35 in which the feedback ball 26*a*, which here is of steel, is received. The play is the same as in FIG. 2. The sides of the ball 26*a* turned directly perpendicular to the axis of the spool 19*a* are formed with flats to minimize friction, and to allow anything dropping in the sleeve 35 to fall completely through.

With both of these arrangements good force transmission is assured with minimal sliding friction. The materials are not likely to stick together, and a long service life can be expected from them even if there is only point contact between them.

I claim:

1. A servovalve comprising:

a flow-control valve connectable between a source of fluid pressure and a load and having a steel spool defining an axis and displaceable therealong between an open position permitting fluid flow between the load and the source and a closed position axially offset therefrom and blocking such flow, the spool being formed with a radially open cylindrical bore having an inner steel surface;

a pilot valve having an impact plate and a pair of nozzles operatively axially oppositely effective on the spool and oppositely flanking the plate, whereby when the plate is closer to one of the nozzles than to the other the spool is axially displaced into one of its positions and when the plate is closer to the other nozzle the spool is urged axially oppositely;

a servomotor connected to the impact plate to move same between the nozzles;

a spring attached to the impact plate, extending generally radially of the spool axis, and having a free end projecting into the bore of the spool, the spring and axis defining a plane; and a spherical corundum ball fixed to the free end of the spring, fitted in the bore, formed with two opposite flats lying in planes parallel to the plane of the spring and axis, and having an outer surface engageable with the inner surface of the bore.

2. The servovalve defined in claim 1 wherein the monocrystal is corundum.

3. The servovalve defined in claim 1 wherein the ball is received with a radial play of between 0.1 micron and 4 micron in the recess.

* * * * *